2,984,335

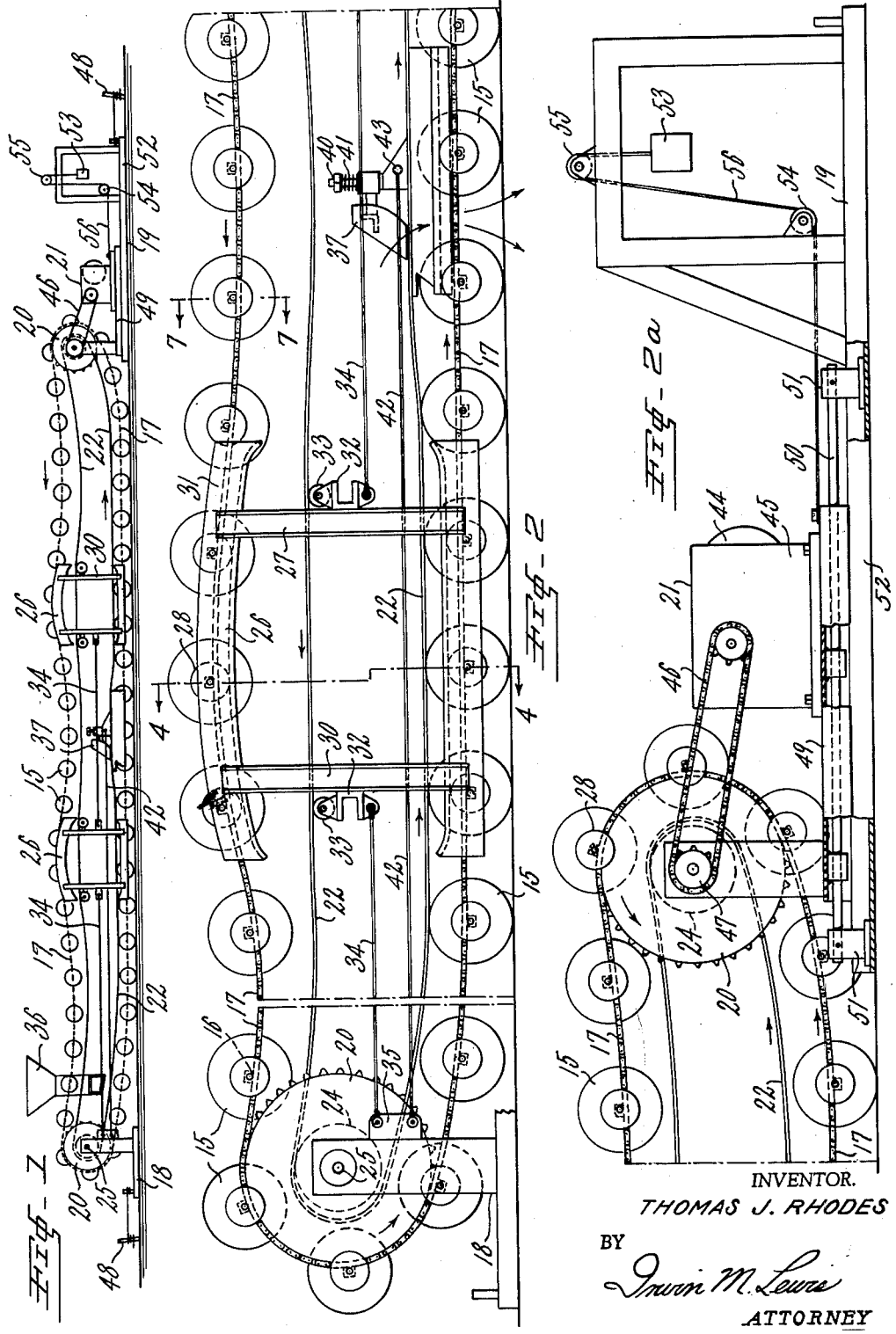

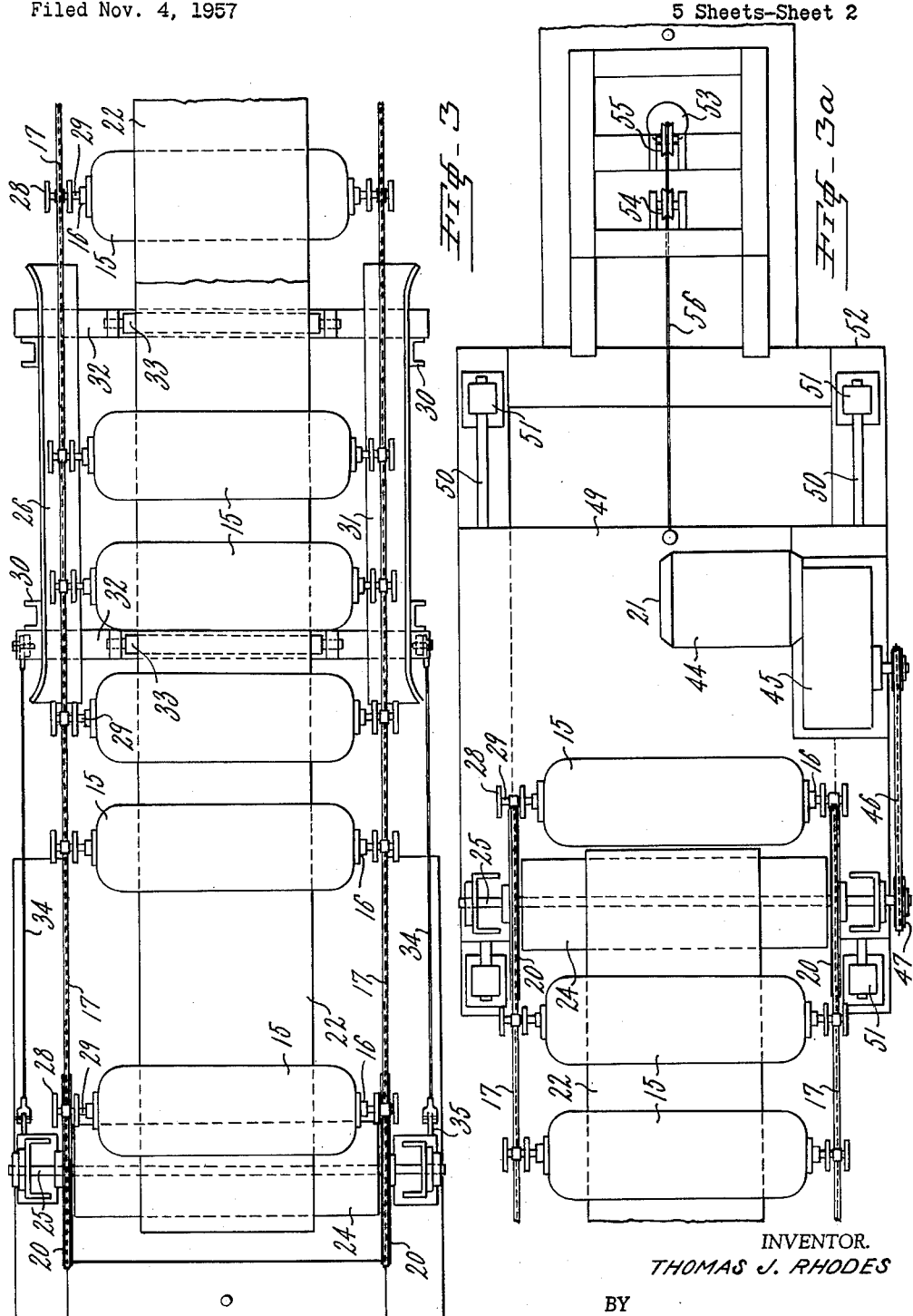

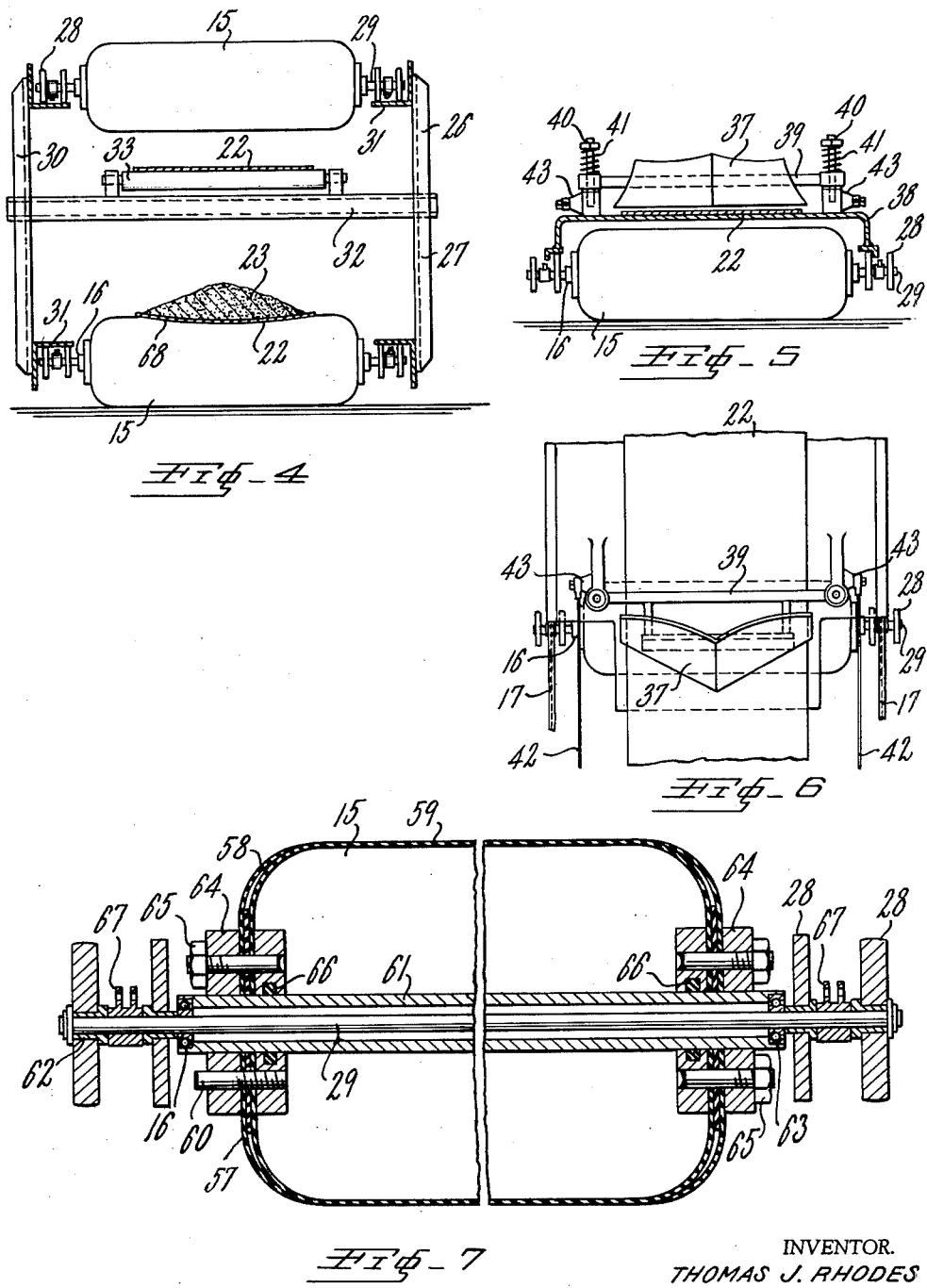

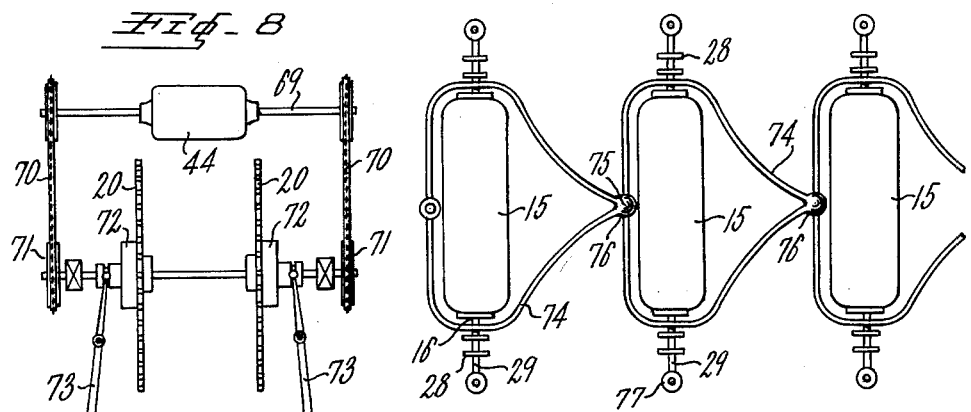
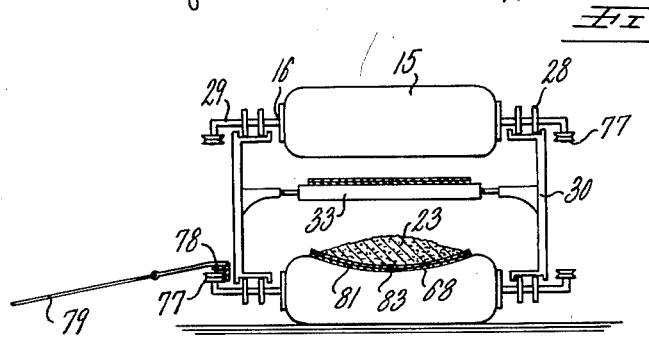
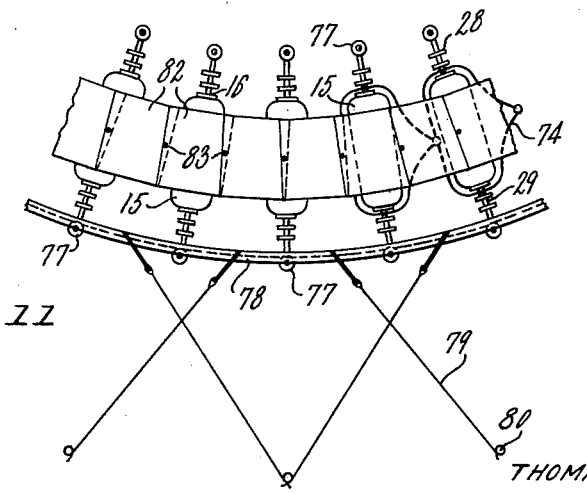
INVENTOR.
THOMAS J. RHODES
BY
*Irwin M. Lewis*
ATTORNEY May 16, 1961 T. J. RHODES 2,984,335
CONVEYOR
Filed Nov. 4, 1957 5 Sheets-Sheet 5
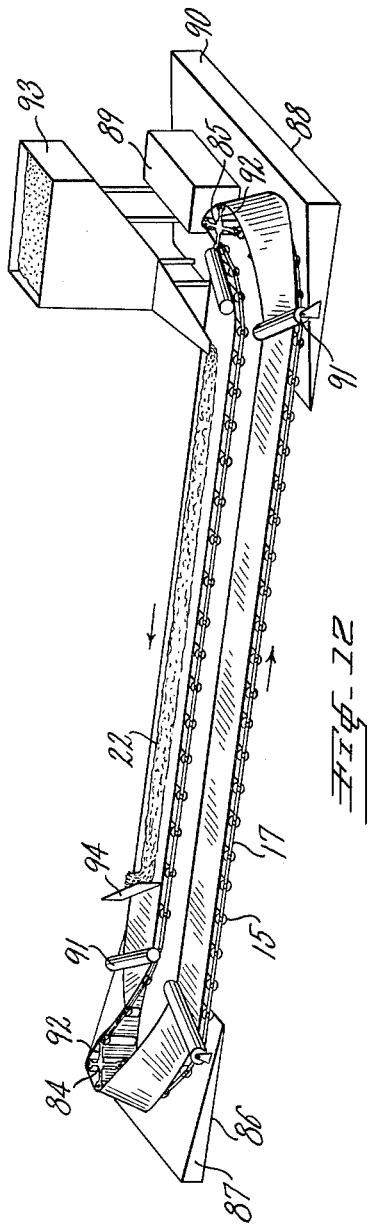
INVENTOR.
THOMAS J. RHODES
BY
Irwin M. Lewis
ATTORNEY United States Patent Office 2,984,335
Patented May 16, 1961

CONVEYOR

Thomas J. Rhodes, Smoke Rise, N.J., assignor to United States Rubber Company, New York, N.Y., a corporation of New Jersey Filed Nov. 4, 1957, Ser. No. 694,185

8 Claims. (Cl. 198—203)

This invention relates to a conveyor system and more specifically to a conveyor system incorporating a continuous belt.

In accordance with the present invention, the continuous belt is supported and driven by peripheral contact with a moving, endless track formed of interconnected rollers.

This is in contrast to conventional systems in which the rollers are stationary and supply only support for the belt, said belt being driven by independent means applied directly thereto. In such a conventional type of conveyor, the belt is subjected to considerable tension and must, therefore, be constructed with suitable longitudinal reinforcement. Such a belt is expensive to construct. Splicing several lengths of belting, in the event a very long conveyor is desired, is difficult if not impossible conventionally since the tensile load applied to the belt is generally sufficient to separate the segments. The application of motive power directly to the belt results in excessive wear and necessitates rapid replacement of belts and, consequently, increased cost of operation.

It is the primary object of the present invention to construct a conveyor in which the motive power will be applied to the track, the belt being driven by frictional contact with the surfaces of the rollers comprising the track, thus permitting use of a light-weight and inexpensive belt.

It is a further object of this invention to provide a portable conveyor that can be installed quickly and inexpensively. Another object is to provide such a conveyor that can operate over rough and uneven terrain.

In accordance with this invention, these objects are achieved by forming a conveyor comprised of a pair of spaced supports or stations and an endless track trained around and extending between these supports. This track is composed of rollers, pivotally connected together in spaced relationship and freely rotatable, so that they will rotate upon contact with any surface between the supports. Means to drive this track of rollers are provided. An endless, flexible belt extends between these supports, and moves with and is supported by frictional contact with the upper peripheral surfaces of those rollers in contact with the surface between the supports.

Since it is only necessary to stake down the two end supports or stations, this conveyor has a high degree of portability. Being driven by the rollers upon which it travels, no tension need be carried by the belt, thus permitting the use of a light, inexpensive, easily spliceable belt. As well as being inexpensive of itself, the belt, since it is not under tension, will also have a greater service life, with a consequent saving in replacement costs.

More specifically, it is preferable to use large, inflated, air bags as the rollers in this conveyor. These air rollers will cushion the material on the belt and thus reduce shock. The air bag also forms a natural trough to contain the material on the belt. A conveyor thus constructed may move over very rough or wet ground without special preparation. There will be very low friction losses due to the low coefficient of rolling friction inherent to such air bags.

A further advantage of a conveyor of this construction is that it will act as its own stacking device. Discharge of the material on the belt may be between the rollers, and the conveyor is then able to climb up on the material it deposits and continue to do so until the desired stack height is reached. The use of air bags as rollers makes this extremely practicable. This is in contrast to the much more costly methods now in use, such as the utilization of overhead structures either of the stationary elevator type or of the movable power shovel variety.

For a better understanding of these and other characteristics and advantages of the present invention, reference should be had to the following description and the accompanying drawings, wherein, Fig. 1 is an elevational view of my conveyor;

Fig. 2 is an enlarged elevational view of the left-hand portion of my conveyor;

Fig. 2a is an enlarged elevational view of the right-hand portion of my conveyor;

Fig. 3 is a plan view of the left-hand portion of my conveyor;

Fig. 3a is a plan view of the right-hand portion of my conveyor;

Fig. 4 is a sectional view taken on line 4—4 of Fig. 2;

Fig. 5 is an elevational view of a form of unloading device suitable for use with my conveyor system;

Fig. 6 is a plan view of such an unloading device;

Fig. 7 is an enlarged cross-sectional view along line 7—7 of Fig. 2;

Fig. 8 is a plan view of an alternate means of driving my conveyor;

Fig. 9 is a plan view of an alternate means of connecting the rollers;

Fig. 10 is a sectional view through a conveyor whose rollers are interconnected by the means shown in Fig. 9;

Fig. 11 is a plan view of the ground-contacting portion of a conveyor, the rollers being interconnected by the means shown in Fig. 9, the conveyor being disposed to travel around a corner; and Fig. 12 is a perspective view of an alternate configuration of a conveyor constructed according to the teaching of this invention.

Referring to the drawings and especially to Fig. 1 it is seen that my new conveyor consists of a series of rollers 15 which are free running on journals 16. The journals 16 are connected in an endless track arrangement by means of connecting chains 17. The series of rollers 15 passes over two portable end stations or supports 18 and 19 equipped with sprockets 20. One end station 19 has a power drive 21. The other station 18 is free-floating.

An endless, flexible belt 22 is arranged to ride on the top of those rollers 15 that are in contact with the ground. This belt 22 carries the material 23 being conveyed. Each of the two end stations 18 and 19 has an idling drum 24 mounted concentrically and on the same axle 25 as the sprockets 20. The belt 22 returns over these idling drums 24 on the underside of the returning, non ground-contacting rollers 15.

Figs. 2 and 3 show the left-hand portion of a typical version of my conveyor in somewhat greater detail. The chain-connected rollers 15 are shown passing over the sprockets 20 at the free-floating end support or station 18. The flexible belt 22 is shown in contact with the ground-contacting rollers 15 and passing over the idling drum 24 which is co-axial with the pair of sprockets 20.

Where necessary the returning belt 22 and roller system may be supported by one or more supporting stations 26 provided at intervals as needed. One such supporting station 26 is shown in Figs. 2, 3 and 4. Such a station may consist of a light metal frame 27 which can ride on the connecting chain 17 or on wheels 28 affixed to the axles 29 of the rollers 15, as shown in Fig. 4. The vertical members 30 of this frame may be made of channel sections, which support horizontal members 31 formed of angle sections, which, in turn, ride on and support the wheels 28. This frame 27 may carry cross bars 32, which also may be formed of channel sections. These cross bars 32 each support a free-running cross roller 33 which supports the belt 22 just underneath the returning rollers 15. These supporting stations 26 may be interconnected by means of a light wire cable 34 attached at one end to the cross bars 32 and at the end support 18 to a fitting 35. Such a cable 34 will hold the various supporting stations 26 in any desired fixed position.

In order to load the conveyor, a side-feeding hopper 36 may be provided at one end as shown in Fig. 1. Earth, gravel, sand or any other material 23 which may be deposited in the mouth of the hopper 36 is thereby funneled onto the belt 22 to be conveyed to the desired location.

The load material 23 may be removed from the conveyor by means of a plow 37 as shown in Figs. 1, 2, 5 and 6. This plow 37 may be mounted on a frame 38 which also may ride on the wheels 28 affixed to the axles 29 of the rollers 15 as shown in Fig. 5. The frame 38 supports a cross bar 39 to which the plow 37 is actually fastened by welding or similar means. Adjusting screws 40 furnished with shock-absorbing springs 41 permit heightwise adjustment of the plow 37 with respect to the surface of the loaded belt 22. In the form shown in Figs. 1, 2, 5 and 6, discharge from the belt 22 is to both sides. The transported material 23 on being plowed from the belt 22 is permitted to fall between the rollers 15. The unloading device 37 is maintained in the desired position on the conveyor by means of wire cables 42, which are attached to lugs 43 on each side of the frame 38 and to the fittings 35 at the end support station 18. It is obvious that the plow 37 can be moved forward or backward by adjustments to this wire cable 42. Thus, where desired, a uniform disposal of the transported material may be obtained through use of this conveyor system.

Figs. 2a and 3a show the right-hand portion of my conveyor in greater detail. The right-hand end station 19 in the conveyor chosen for illustration has the means for power drive. Power from a portable engine 44 and drive mechanism 45 is transmitted by a drive chain 46 to a drive wheel 47 which is coaxial with the sprockets 20 over which the chains 17 pass. Whereas the left-hand end support 18 is merely anchored to the ground by a stake 48 or some similar means, the right-hand end 19 including power units is mounted in a movable frame 49 which, in turn, can slide on shafts 50 which are supported in trunnions 51 in a stationary frame 52. The entire system is kept under the proper tension by means of a balance weight 53 which is supported by a pair of pulleys 54 and 55 and attached by a cable 56 to the movable frame 49. This stationary frame 52 is also staked to the ground in a way similar to the anchoring of the left-hand end support 18. (See Fig. 1).

A preferred form of roller 15 suitable for use with my conveyor is inflatable and flexible and made as shown in Fig. 7. Such a roller 15 may be made of rubberized cord fabric, plastic or other suitable flexible and gas impervious materials. The sides 57 of one example of the preferred type of roller 15 may be made of several plies 58 of rubberized cord fabric in a manner well known to the tire industry. The ground-contacting portion 59, however, may be made of lighter construction, which is contrary to the usual tire building practice. A surface coating of rubber or other similar material on the cord fabric will protect the roller 15 from external abrasions due to use.

This roller 15 is inflatable by means of an air valve 60 located in the side 57. It is usually desirable to have an axle 29 and roller shaft 61 running through the roller 15 to furnish axial strength. In motion, the axle 29 does not rotate but is drawn by the connecting chains 17. The wheels 28 are adpted to rotate on this axle 29 by means of bearings 62. The roller shaft 61 also can rotate about the axle 29 by means of roller bearings 63. The roller shaft 61 is connected to the roller sides 57 by means of fittings 64 and bolts 65. A sealing ring 66 is provided to prevent air leakage and a link 67 is provided on the axle 29 to facilitate attachment of the connecting chains 17.

Since the preferred form of roller 15 has a longitudinal axis of greater length than its nominal diameter (when in the unloaded state), it can be described as being "axially-elongated." When made of a flexible, inflatable fabric, the roller 15 can cushion the material carried on the belt 22 and thus reduce shock. Hence, flexibility is a favorable characteristic, especially when it is desired to use the conveyor in rough terrain. If the air pressure is kept sufficiently low, a natural trough 68 is formed to contain the material 23 on the belt 22, as shown in Fig. 4. Friction losses will be very low due to the low coefficient of rolling friction of an air bag. Finally, when the conveyor is not in use, the rollers 15 may be deflated to facilitate storage. Since an inflatable roller 15 is a preferred form for all the above reasons, this roller 15 can well be described as being "fluid-distensible."

The belt 22 may be made of a number of plies of rubberized cord fabric or may be made of any other convenient, moderately flexible fabric. Preferably, its width is less than the axial length of a roller 15. (See Fig. 4). This is to permit the plow 37 to scrape the material 23 from the belt 22 and push it between the moving rollers 15. With this feature the conveyor can act as its own stacking device. Discharging the load material 23 between the air rollers 15 permits the conveyor to climb up on the material it deposits. This feature saves the necessity of providing separate stacking structures.

The conveyor as above described is useful for conveying material from one location to another and also for conveying and stacking material in a pile of uniform height. This latter feature is possible because of the longitudinal adjustability of the unloading device exemplified by the plow 37 as above described, which may deposit the material between the moving rollers 15.

My conveyor can also be used as a spreader if means are provided to swing the conveyor in a fan-shaped area. Fig. 8 shows an arrangement whereby this lateral movement may be accomplished. Power from the motor 44 and drive shaft 69 is transmitted by two drive chains 70 to drive wheels 71 on either side of and coaxial with the sprockets 20. Clutch mechanisms 72 operated by hand levers 73 are provided to vary the speeds of the two sprockets 20. Such a varying of speeds of the two sprockets 20 on the drive end 19 of the conveyor will tend to make the whole system move to one side or the other. When coupled with the longitudinal adjustability of the plow 37, it can be seen that material may be deposited over any desired area and to any desired height.

The drive end of the conveyor can be attached to a tractor or a truck to increase mobility and facilitate spreading of material as above described.

It is also possible to construct a conveyor of this type so that it can move around corners. This requires the rollers to be mounted in a tandem arrangement as shown in Fig. 9. A frame 74 must be used to permit each roller to be pivoted from a central point 75 by means of a universal joint 76. With this arrangement it is possible to have even greater flexibility in laying out a conveyor of this type.

However, it is necessary to stake down a conveyor of this type in the region of the turn. This is due to the inherent tendency of any track under tension to straighten out. Accordingly, besides the vertical wheels 28, each roller axle 29 must also be fitted with a horizontal wheel 77. This horizontal wheel 77 must be adapted to run in a guide track 78, all as shown in Figs. 10 and 11. The guide track 78, which can be made of any light metal, must be of sufficient length to engage those rollers 15 actually involved in the turn. Cables 79 and stakes 80 will serve to anchor the guide track 78.

It is also required that the belt have lateral flexibility for this type of system. This can be accomplished by using a sectionalized belt 81 pivoted in the center as shown in Figs. 10 and 11. The sections 82 of the belt 81 can be chosen of any convenient length, and they can be fastened together by a pin 83 or other similar device. This is practical because of the fact that the load material 23 is not moved by tension on the belt but is moved by contact with the rollers 15 so that there is no necessity for longitudinal reinforcement of the belt 81.

A further example of a conveyor system of this type is illustrated in Fig. 12. With this configuration, it is possible to transport material in both directions simultaneously. The rollers 15 and belt 22 are similar to those utilized in the conveyor arrangement above described. However, instead of employing a sprocket 20 and idling drum 24 arrangement, turntables 84 and 85 are used for the end supports.

Referring to Fig. 12 the left-hand end support 86 of this conveyor configuration is composed of a floating turntable 84 mounted on a wedge-shaped platform 87. The right-hand end support 88 is composed of a source of power 89 which actuates the driving turntable 85 and is also mounted on a wedge-shaped platform 90. Guide rollers 91 are used to keep the belt 22 and track engaged with the arms 92 of the end turntables 84 and 85. Loading of material can be by means of a hopper 93 or other similar device. A suitably mounted deflector 94 can be used to remove material as desired.

Many other similar configurations can be devised. Accordingly it is my intention to cover all changes and modifications of the examples of the invention herein chosen for purposes of the disclosure which do not constitute departures from the spirit and scope of the invention.

Having thus described my invention, what I claim and desire to protect by Letters Patent is:

1. A conveyor comprising a pair of spaced supports, an endless track trained around and extending between said supports, said track being formed of a plurality of ground-contacting rollers pivotally connected together in spaced relationship, said rollers being freely rotatable so that they will rotate upon frictional contact with the ground in between said supports, means for driving said track, and an endless, flexible belt extending between said supports and movable with and supported by said track by frictional contact with the upper peripheral surfaces of at least some of said rollers.

2. A conveyor comprising a pair of spaced supports, and endless track trained around and extending between said supports, said track being formed of a plurality of axially - elongated, flexible - walled, fluid - distensible ground-contacting rollers pivotally connected together in spaced parallel relationship, said rollers being freely rotatable so that they will rotate upon frictional contact with the ground in between said supports, means for driving said track, and an endless, flexible, load-carrying belt extending between said supports and movable with and supported by said track by frictional contact with the upper peripheral surfaces of at least some of said rollers.

3. A conveyor comprising a pair of spaced supports, and endless track trained around and extending between said supports, said track being formed of a plurality of axially-elongated, flexible-walled, fluid-distensible ground-contacting rollers, chains connecting said rollers together by journal means at their ends, said rollers being held in spaced parallel relationship, said rollers being freely rotatable so that they will rotate upon frictional contact with the ground in between said supports, means for driving said track, and an endless, flexible, load-carrying belt extending between said supports and movable with and supported by said track by frictional contact with the upper peripheral surfaces of at least some of said rollers.

4. A conveyor comprising a pair of spaced supports, an endless track trained around and extending between said supports, said track being formed of a plurality of axially-elongated, flexible-walled, fluid-distensible ground-contacting rollers, chains connecting said rollers together by journal means at their ends and holding said rollers in spaced parallel relationship, said rollers being freely rotatable so that they will rotate upon frictional contact with the ground in between said supports, a pair of co-axial sprockets at each of said supports over which sprockets said chains pass, means for driving said track, an endless, flexible belt extending between said supports, and an idling drum co-axial with each of said pair of sprockets and over which each end of said belt passes, said belt being movable with and supported by said track by frictional contact with the upper peripheral surfaces of at least some of said rollers.

5. A conveyor comprising a pair of spaced supports, an endless track trained around and extending between said supports, said track being formed of a plurality of axially-elongated, flexible-walled, fluid-distensible ground-contacting rollers, chains connecting said rollers together by journal means at their ends and holding said rollers in spaced parallel relationship, said rollers being freely rotatable so that they will rotate upon frictional contact with the ground in between said supports, a pair of co-axial sprockets at each of said supports over which sprockets said chains pass, means for driving said track, an endless, flexible belt extending between said supports, an idling drum co-axial with each of said pair of sprockets and over which each end of said belt passes, said belt being movable with and supported by said track by frictional contact with the upper peripheral surfaces of at least some of said rollers, means to load material onto said belt, and means for removing the load material from said belt.

6. A conveyor comprising a pair of spaced supports, an endless track trained around and extending between said supports, said track being formed of a plurality of axially-elongated, flexible-walled, fluid-distensible rollers, chains connecting said rollers together by journal means at their ends and holding said rollers in spaced parallel relationship, said rollers being freely rotatable so that they will rotate upon frictional contact with the ground in between said supports, a pair of co-axial sprockets at each of said supports over which sprockets said chains pass, the axes of said sprockets being substantially horizontal so as to cause approximately half of said rollers to be in contact with the ground at any particular instant, means for driving said track, an endless, flexible belt extending between said supports, an idling drum co-axial with each of said pair of sprockets and over which each end of said belt passes, said belt being movable with and supported by said track by frictional contact with the upper peripheral surfaces of at least some of said ground-contacting rollers, means to prevent excessive sagging of the returning rollers and belt, means to load material onto said belt and means for removing the load material from said belt.

7. A conveyor comprising a pair of spaced supports, an endless track trained around and extending between said supports, said track being formed of a plurality of axially-elongated, flexible-walled, fluid-distensible rollers, chains connecting said rollers together by journal means at their ends and holding said rollers in spaced parallel relationship, said rollers being freely rotatable so that they will rotate upon frictional contact with the ground in between said supports, a pair of co-axial sprockets at each of said supports over which sprockets said chains pass, the axes of said sprockets being substantially horizontal so as to cause approximately half of said rollers to be in contact with the ground at any particular instant, means for driving said track, an endless, flexible belt extending between said supports, the width of said belt being less than the axial length of said rollers, an idling drum co-axial with each of said pair of sprockets and over which each end of said belt passes, said belt being movable with and supported by said track by frictional contact with the upper peripheral surfaces of at least some of said ground-contacting rollers, means to prevent excessive sagging of the returning rollers and belt, means to load material onto said belt and means for removing the load material from said belt.

8. A conveyor comprising a pair of spaced supports, an endless track trained around and extending between said supports, said track being formed of a plurality of ground-contacting rollers pivotally connected together so as to permit the axes of said rollers to lie in angular spaced relationship, said rollers being freely rotatable so that they will rotate upon frictional contact with the ground in between said supports, means for driving said track, and an endless flexible belt extending between said supports, said belt being formed of a plurality of rectangular sections pivotally connected together, said belt being movable with and supported by said track by frictional contact with the upper peripheral surfaces of at least some of said rollers.

References Cited in the file of this patent

UNITED STATES PATENTS

| | | |
|---|---|---|
| 752,651 | Camp | Feb. 23, 1904 |
| 1,363,533 | Roe | Dec. 28, 1920 |
| 1,699,764 | Solem | Jan. 22, 1929 |
| 2,007,910 | Stephens | July 9, 1935 |
| 2,651,286 | Oldham | Sept. 8, 1953 |

FOREIGN PATENTS

| | | |
|---|---|---|
| 737,634 | Great Britain | Sept. 28, 1955 |